United States Patent
Farquhar et al.

(10) Patent No.: US 6,837,541 B2
(45) Date of Patent: Jan. 4, 2005

(54) VEHICLE SEAT HAVING A LUMBAR SUPPORT SYSTEM

(75) Inventors: Mark Farquhar, Ortonville, MI (US); Ken McQueen, Leonard, MI (US); Mladen Humer, Eastpointe, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/260,997

(22) Filed: Sep. 30, 2002

(65) Prior Publication Data

US 2004/0061363 A1 Apr. 1, 2004

(51) Int. Cl.[7] ............................................... B60N 2/42
(52) U.S. Cl. .............................. 297/216.13; 297/284.4
(58) Field of Search ..................... 297/216.12, 216.13, 297/216.14, 216.1, 408, 61, 284.4, 284.1

(56) References Cited

U.S. PATENT DOCUMENTS

| | | | | |
|---|---|---|---|---|
| 5,651,582 A | * | 7/1997 | Nakano | 297/216.13 |
| 5,673,972 A | * | 10/1997 | Dudash et al. | 297/216.1 X |
| 5,722,722 A | | 3/1998 | Massara | 297/216.13 |
| 5,772,281 A | | 6/1998 | Massara | 297/216.12 |
| 5,779,263 A | * | 7/1998 | Lane et al. | 280/730.2 |
| 5,884,968 A | * | 3/1999 | Massara | 297/216.12 |
| 5,938,279 A | | 8/1999 | Schubring et al. | 297/216.12 |
| 6,036,266 A | | 3/2000 | Massara | 297/328 |
| 6,199,947 B1 | | 3/2001 | Wiklund | 297/216.12 |
| 6,213,549 B1 | | 4/2001 | Wieclawski | 297/216.13 |
| 6,416,125 B1 | * | 7/2002 | Shah et al. | 297/216.12 |
| 6,416,127 B1 | | 7/2002 | Galbreath, Jr. et al. | 297/216.13 |

* cited by examiner

Primary Examiner—Peter M. Cuomo
Assistant Examiner—Stephen Vu
(74) Attorney, Agent, or Firm—Bliss McGlynn, P.C.; Bill Panagos

(57) ABSTRACT

A vehicle seat assembly including a seatback frame and a lumbar support system operatively mounted to the seatback frame. The lumbar support system includes a lower suspension mechanism that is generally aligned with the pelvic and lumbar regions of the occupant of the seat assembly. The lower suspension mechanism includes a band of flexible material that is stretched about a pair of upstanding support members so as to have a predetermined tension for providing support for the occupant of the seat assembly at the pelvic and lumbar regions.

6 Claims, 9 Drawing Sheets

VEHICLE SEAT HAVING A LUMBAR SUPPORT SYSTEM

BACKGROUND OF THE INVENTION

1. Field of the Invention

The present invention relates, generally, to a vehicle seat and, more specifically, to a vehicle seat having a pelvic and lumbar support system.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seat back or lower seat assemblies, as well as a number of safety features including occupant restraint devices such as seatbelts. The seatback assembly also includes a headrest that is typically mounted at the top or upper end of the seatback.

In the context of vehicle seating design, there is an ongoing effort to improve the safety of the vehicle occupant in the event of a collision. More specifically, there continues to be an ongoing effort to provide safety mechanisms that reduce the chance of injury in the region of the passengers' neck. In the event of a rearward impact, the occupant is forced against the seat and can experience a very large energy pulse. In such circumstances, the pelvis and lumbar regions of the occupant generally exert more force, initially, on the seatback than do the thoracic or shoulder regions of the occupant. This initial load may cause a separation between the seatback and the thoracic, neck, and head regions of the occupant. Depending on the force of the rear impact, this separation can be quickly and violently closed by a following movement of the upper torso, neck, and head of the passenger toward the seatback in an event commonly known as "whiplash." Thus, there has been an ongoing effort to address this problem in the context of vehicle seating safety.

In the past, the headrest was a relatively static device that was typically moveable up and down or slightly tiltable, but usually in connection with adjustments made for the comfort of any given occupant of the seat during normal driving conditions. However, in order to address the problems encountered during a rearward collision, dynamic or active headrest mechanisms have been proposed in the related art.

For example, U.S. Pat. No. 5,938,2796 issued to Schubring et al. and assigned to the assignee of the present invention discloses a dynamic vehicle head restrain assembly that is designed to reduce the amount of separation between the occupant and the seatback in the event of a rearward collision. The head restraint assembly includes an impact or target plate that is supported by the seatback frame in the general area corresponding to the thoracic or shoulder region of the occupant. The impact plate is pivotally mounted to a linkage that is connected to the headrest. In the event of a rearward collision, the force of the occupant on the target plate actuates the linkage to cause the headrest to move upwardly and forwardly toward the head of the occupant, thereby reducing the amount of separation between the occupant and the seatback.

While the dynamic head restraint systems of the type known in the related art were an improvement over the previously known static headrests, there remains a need in the art to better absorb and dissipate the energy generated by the force acting on the seatback in the event of a rearward collision, especially at the pelvic and lumbar areas, which are generally remote from the headrest.

U.S. Pat. No. 6,565,150, assigned to the assignee of the present invention, discloses a vehicle seat having an active headrest that is designed to address this problem. More specifically, the seat has a pivotal support assembly that is mounted to the seat back frame and is operatively connected to the headrest such that the headrest moves upwardly and toward the occupant in the event of a rearward collision. The pivotal support assembly includes a lower impact target that is located in the pelvic and lumbar regions to dissipate the forces that are first translated to the seatback in this area. The lower target is operatively connected to a reaction plate that is pivotally mounted to the seatback. In turn the headrest is mounted to the reaction plate.

While the dynamic head restraint systems known in the related art have generally worked for their intended purposes and have improved safety, there remains a need in the art for a vehicle seat having an active head restraint system that better absorbs the energy generated by the force at both the pelvic and lumbar regions as well as the force generated at the thoracic or shoulder regions of the occupant. This is especially true in the case of at the smaller or narrower seat. Vehicle seats of this type generally inhibit penetration into the seatback or shoulder region of the occupant in the event of a rearward collision. Furthermore, and as noted above, penetration at the shoulder area into the seatback occurs only after the initial penetration that occurs at the pelvic and lumbar regions of the occupant.

Over and above the need to deal with forces generated in the event of a rearward collision, there is an ongoing need in the related art for a vehicle seat that can withstand greater impacts and thereby provide better factors of safety for the vehicle occupant in the event, for example, of a side impact.

SUMMARY OF THE INVENTION

The present invention overcomes the deficiencies in the related in a vehicle seat assembly having a seatback frame and lumbar support systems operatively mounted to said seatback frame. The lumbar support system includes a pair of upstanding support members and a lower suspension mechanism that is generally aligned with the pelvic and lumbar regions of the occupant of the seat assembly. The lower suspension mechanism includes at least one band of flexible material that is disposed about the upstanding support members such that the band of flexible material presents a forward surface that is disposed between the upstanding support members immediately adjacent the pelvic and lumbar regions of the occupant of the seat assembly. In addition, the band of flexible material also presents a rearward surface that is disposed in spaced parallel relationship relative to the forward surface and relatively remote to the pelvic and lumbar regions with respect to the forward surface. The band of flexible material is stretched about the upstanding support members so as to have a predetermined tension for providing support for the occupant of the seat assembly at the pelvic and lumbar regions. In the event of a rear impact on the vehicle, the forward surface is moveable toward the rearward surface such that the band of flexible material absorbs energy generated at the pelvic and lumbar regions by a force exceeding a predetermined level.

In this way, the lumbar support system of the present invention provides the needed support in the pelvic and lumbar region of the vehicle seat and is also capable of absorbing and dissipating the energy generated by a force that exceeds a predetermined level at the pelvic and lumbar regions in the event of a rearward collision. In one embodiment of the present invention of the band of flexible material maybe adjusted to provide varying degrees of tension according to the desires of the occupant.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
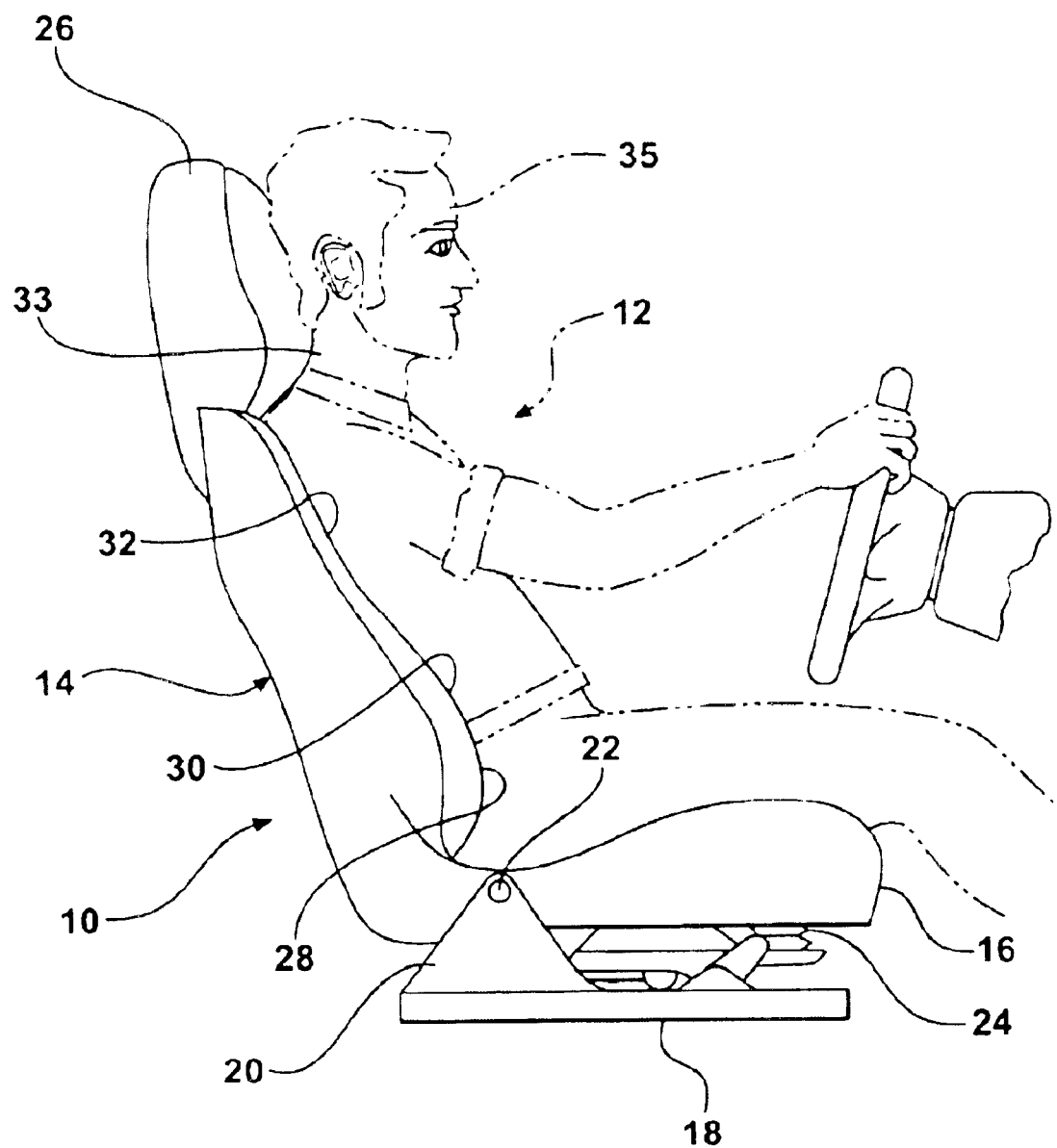
FIG. 1 is an elevational side view of a vehicle seat of the type at may include a lumbar support system of the present invention illustrated in relation to a schematically shown occupant of the vehicle seat.

Referring now to the drawings where like numerals are used to designate like structure throughout the figures, a vehicle seat of the type that may employ lumbar support system of the present invention is generally indicated at 10 in FIG. 1. A theoretical "occupant" is schematically indicated at 12 and is shown in what could be referred to as a "normal driving position." The vehicle seat 10 includes a seatback, generally indicated at 14, a lower seat assembly, generally indicated at 16 that is supported on a seat track 18, as is commonly known in the art. The seatback 14 may be pivotally connected about pivot point 22 to the lower seat assembly 16 by means of a bracket 20 that forms a part of the seat track mechanism 18. In this way, the seat assembly 10 may be adapted to recline or adjust in a number of ways that are commonly known in the art, but which form no part of the present invention. Furthermore, the lower seat assembly 16 may also include some sort of suspension or support mechanism 24 that adds comfort to the occupant, as is also well known in the art. In addition to these common elements, the seat assembly 10 of the present invention may include various controls and restraint systems, such as seatbelts, etc. that are not shown but that are well known in the art.

A headrest 26 is located at the upper margins of the seatback 14. The occupant has a pelvis region 28, a lumbar region 30, and a thoracic region 32. In addition, the occupant 12 is shown having a neck 33 and head 35. The seatback 14 has similar regions which correspond to the relevant anatomical regions of the occupant 12. In the event of a rear impact, the forces that are generated can cause the occupant 12 to be driven toward the seatback 14. However, the initial forces act at the pelvic and lumbar regions 28, 30, respectively and, as indicated above, this phenomenon can cause a separation between the seatback 14 and the upper torso, thoracic or shoulder regions of the occupant.

A lumbar support system, generally indicated at 37, is operatively mounted to the seatback frame. In the embodiment illustrated in FIGS. 2–9, the lumbar support system is incorporated into an active head restraint system 36 that is, in turn, supported by the seatback frame 34. However, those having ordinary skill in the art will appreciate from the description that follows that the lumbar support system 37 of the present invention is not limited to use with an active head restraint system and therefore may be employed independently of any such system.

Figure 2:
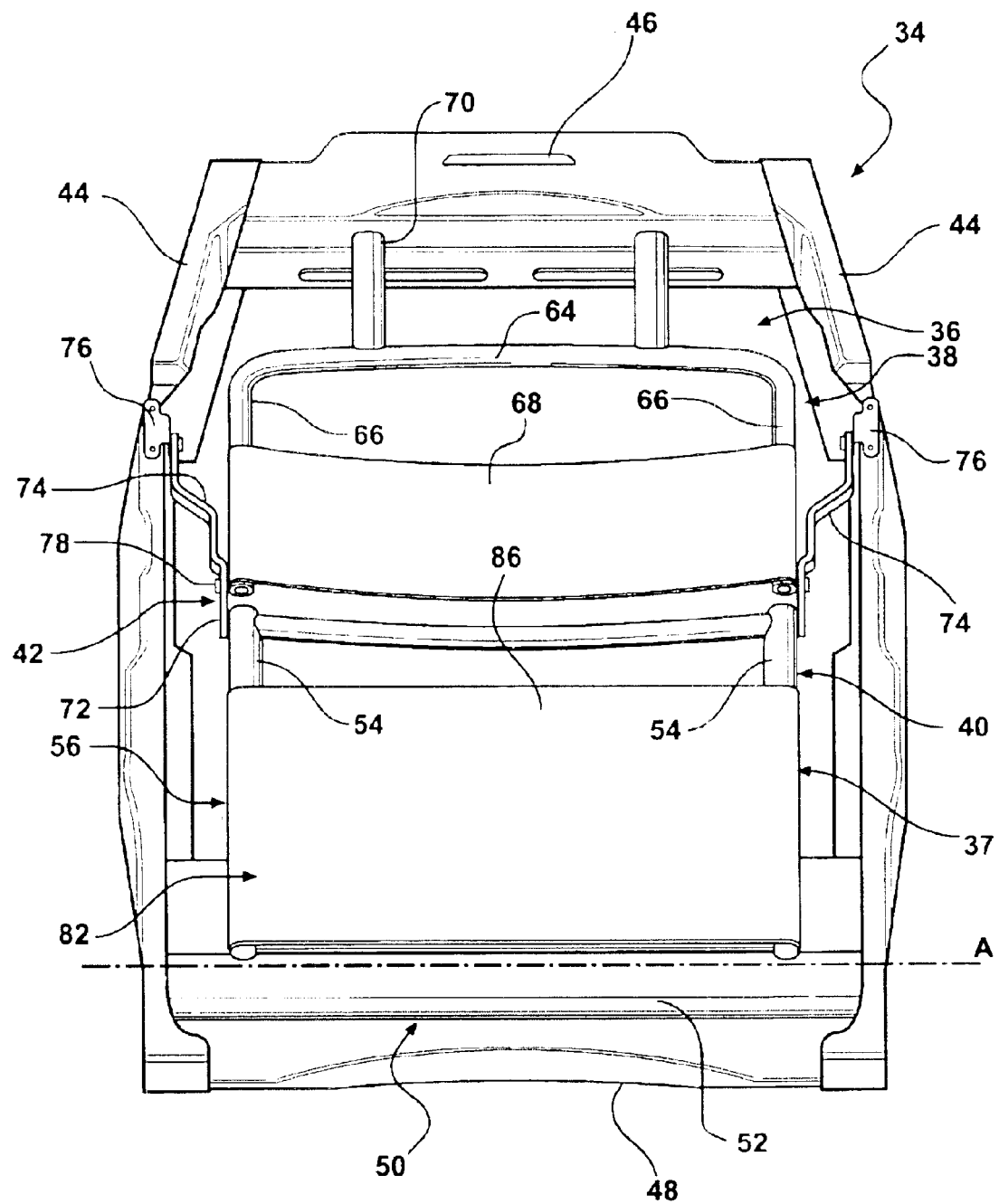
FIG. 2 is a front view of the seatback frame including one embodiment of the lumbar support system of the present invention.
Figure 3:
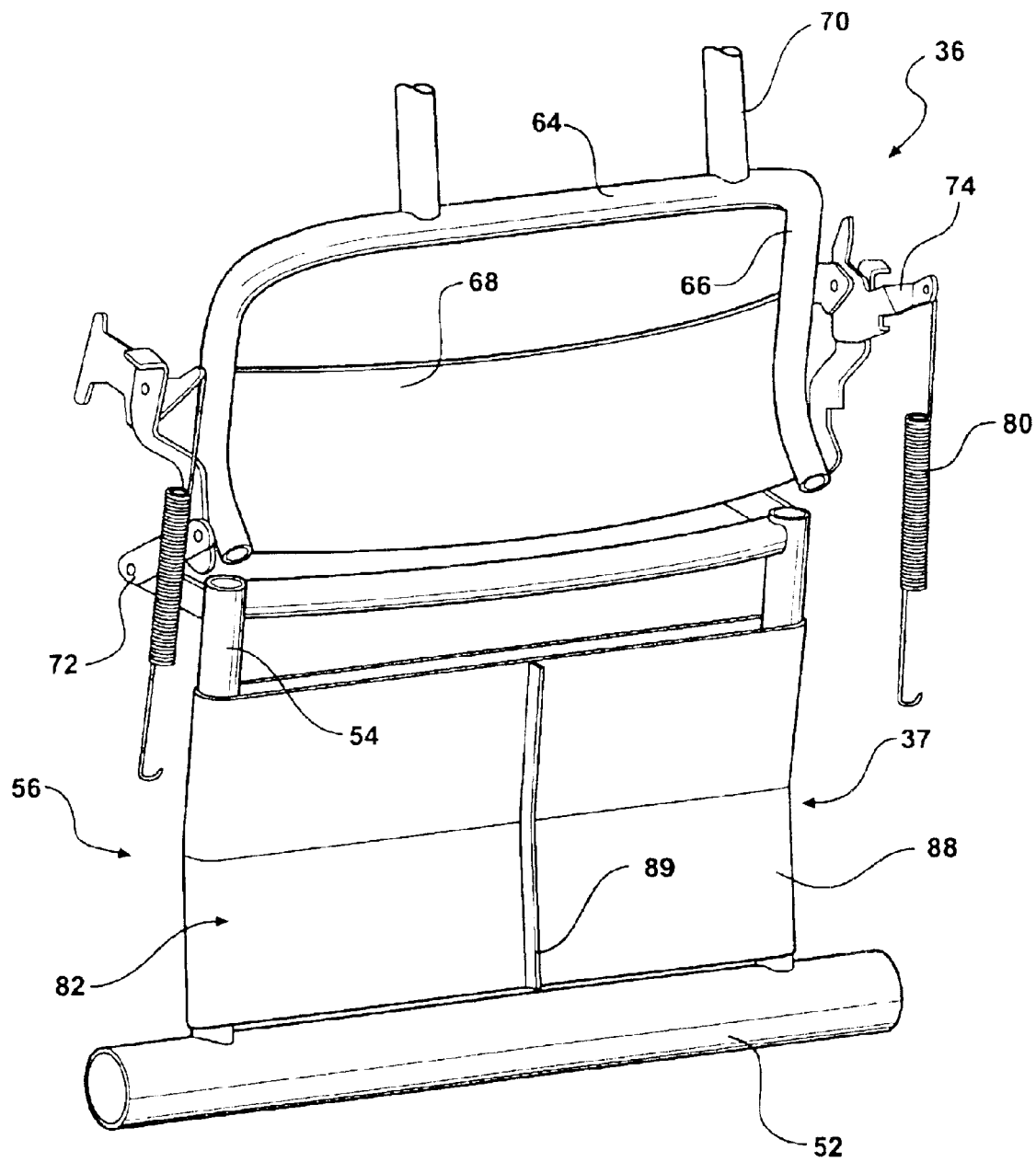
FIG. 3 is a rear elevational view of an active head restraint system that includes the lumbar support system shown in FIG. 2.

More specifically, and referring now to these FIGS. 2–3 the active head restraint system 36 is operatively supported by the seatback frame 34 and includes the headrest 26, an upper armature 38, a lower armature 40, and a linkage 42 operatively interconnecting the upper and lower armatures 38, 40. The upper and lower armatures, 38, 40, as well as the linkage 42 will be described in greater detail below.

The upper armature 38 is pivotally mounted relative to the seatback frame 34 so that it is generally aligned with the thoracic region 32 of the occupant 12 of the seat assembly 10. The headrest 26 is operatively mounted to the upper armature as will be described in greater detail below. Similarly, the lower armature 40 is pivotally mounted to the seatback frame 34 in spaced relationship relative to the upper armature 38 and so as to be generally aligned with the pelvic and lumbar regions 28, 30, respectively, of the occupant 12 of the seat assembly. In its operative mode, the lower armature 40 absorbs energy generated by a force that exceeds a predetermined level at the pelvic and lumbar regions 28, 30. When this occurs, the lower armature 40 acts on the upper armature 38 through the linkage 42 to cause the upper armature 38 and the headrest 26 to pivot upwardly and forwardly so that the headrest 26 moves toward the head 35 of the occupant 12 of the seat assembly 10. In this way, the lower armature 40 acting on the upper armature 38 provides an initial and very fast response to an impact that exceeds a predetermined force. However, over and above the initial forces generated at the pelvic and lumbar regions 28, 30, the upper armature 38 further acts to absorb energy that is generated by a force exceeding a predetermined level at the thoracic regions 32. In this event, the upper armature 38 and the headrest 26 pivot further upwardly and forwardly following the initial response by the lower armature 40 to an impact that exceeds the predetermined force.

The seatback frame 34 includes a pair of side members 44 that are spaced relative to one another and upper and lower cross members 46, 48, respectively, that extend between the pair of side members 44. The seatback frame 34 may have a "unibody" construction wherein the side members 44 as well as the upper and lower cross member 46, 48 are integrally formed. In addition, the seatback frame 34 may be assembled from separate components making up the side members 44 and upper and lower cross members 46, 48 that are then welded or otherwise permanently fixed to each other. Thus, and from the description that follows, those having ordinary skill in the art will appreciate that a number of different means of operatively interconnecting the components of the seatback frame 34 may be employed without departing from the scope of the present invention. The seatback frame 34 further includes a side impact protective strut, generally indicated at 50. The side impact protective strut generally extends transverse to the side members 44 in the space defined therebetween and is preferably disposed proximate to the lower cross member 48. In this way, the side impact protective strut provides added strength to the seat assembly 10 in the transverse direction relative to the side members 44 and in the lumbar region 30 relative to an occupant 12. Furthermore, the side impact protective strut 50 includes a cross member 52 that is pivotally mounted to the side member 44 of the seatback frame 34. The lower armature 40 is mounted to the cross member 52 of the side impact protective strut 50 and is pivotal therewith relative to the seatback frame 34 as will be described in greater detail below. The linkage 42 includes a drag link for providing linear movement of the upper and lower armatures 38, 40 relative to each other.

The lower armature 40 includes a pair of upstanding support members 54 and a lower suspension mechanism, generally indicated at 56, extending between the pair of upstanding support members 54. The lower suspension mechanism 56 provides lumbar support to the occupant 12 of the seat assembly 10 as will be described in greater detail below. In addition, the lower suspension mechanism 56 acts to transfer forces generated in the pelvic and lumbar regions to the lower armature 40. The lower armature 40 is fixedly connected to the cross member 52 that pivots about an axis "A" that extends between the side members 44 of the seatback frame 34.

The upper armature 38 includes a main support member 64 that extends in a generally transverse direction relative to the side member 44 of the seatback frame 34. In addition, the upper armature 38 includes a pair of depending tubular legs 66 that are disposed spaced relative to one another and that extend from the main support member 64 in the general direction of the lower armature 40. The upper armature 38 further includes an upper suspension mechanism 68 that extends between the depending legs 66 and provides thoracic support for the occupant 12 of the seat assembly 10. The upper suspension mechanism 68 acts to transfer forces generated in the thoracic, shoulder, or upper torso regions to the upper armature 38. The upper suspension mechanism 68 may include any suitable device. As illustrated in these figures, the upper suspension mechanism 68 takes the form of a strap that may be made of metal, plastic, fabric or any other suitable material. In addition, the upper armature 38 includes a pair of upstanding tubular headrest supports 70 that are fixed to the main support member 64 in spaced relationship with respect to one another and that extend in the general direction of the upper cross member 46 of the seatback frame 34. The headrest 26 is operatively mounted to the pair of upstanding tubular headrest supports 70 for coordinated movement with the movement of the upper armature 38.

As noted above, the linkage 42 operatively interconnects the upper and lower armatures 38, 40. To this end, the linkage 42 includes a draglink 72 that is attached to the lower armature 40 and is pivotally attached to the upper armature 38 so as to allow for relative linear movement between the upper and lower armature. The interaction of the linkage 42 with the upper and lower armatures translates articulating movement from the lower armature 40 to the upper armature 38 and thus to the headrest 26. On the other hand, the upper armature 38 includes a pair of articulating brackets 74 that are disposed on either side of the upper armature 38. The brackets 74 serve to operatively interconnect the upper armature 38 and the side members 44 of the seatback frame 34. Each of the articulating brackets 74 includes a first end 76 that is pivotally attached to a respective side member 44 for providing upwardly pivotal movement of the upper armature 38 relative to the seatback frame 34. In addition, each of the articulating brackets 74 includes a second end 78 that is pivotally attached to a respective one of the depending legs 66 of the upper armature 38. The second end 78 of the articulating bracket 74 provides forward pivotal movement of the upper armature 38 relative to the seatback frame 34. A biasing member 80 (FIG. 3) extends between each bracket 74 and the side members 44. The biasing member 80 may be of any known type, such as a coiled spring or any other suitable mechanism that acts to move the upper and lower armatures 38, 40 back to their initial position prior to impact.

As mentioned above, the lumbar support system 37 is operatively mounted to the seatback frame 34. The lumbar support system 37 includes a pair of upstanding support members 54 and a lower suspension mechanism, generally indicated at 56. The lower suspension mechanism 56 is generally aligned with the pelvic 28 and lumbar 30 regions of the occupant of the seat assembly 10. In the embodiment illustrated in the figures, the upstanding support members 54 of the lumbar support system 37 also form a part of the lower armature 40. However, and as mentioned above, those having ordinary skill in the art will appreciate that the lumbar support system 37 can exist independent of the lower armature 40 of a head restraint system 36.

In the embodiment illustrated in FIGS. 2 and 3, the lower suspension mechanism 56 includes at least one band of flexible material, generally indicated at 82. The band of flexible material 82 is disposed about the upstanding support members 54 in loop-like fashion such that the band of flexible material 82 presents a forward surface 86 that is disposed between the upstanding support members 54 immediately adjacent the pelvic and lumbar regions 28, 30, respectively, of the occupant of the seat assembly 10. In addition, and as best shown in FIG. 3, the band of flexible material 82 also presents a rearward surface 88 that is disposed in spaced parallel relationship relative to the forward surface 86. The rearward surface 88 is behind the forward surface 86 such that it is relatively remote to the pelvic and lumbar regions 28, 30 with respect to the forward surface 86. The band of flexible material 82 is stretched about the upstanding support members 54 so that it has a predetermined tension for providing support for the occupant of the seat assembly 10 at the pelvic and lumbar regions. Furthermore, and in the event of a rear impact on the vehicle, the forward surface 86 is moveable toward the rearward surface 88 such that the band of flexible material 82 absorbs energy generated by a force exceeding a predetermined level at the pelvic and lumbar regions 28, 30. In the embodiment illustrated in FIGS. 2 and 3, the lower suspension mechanism 56 includes a single band of flexible material 82 that is made of a continuous piece of material looped about the upstanding support members 54. The ends of the material may be sewn together or otherwise fixed as indicated at 89 in FIG. 3.

Figure 4:
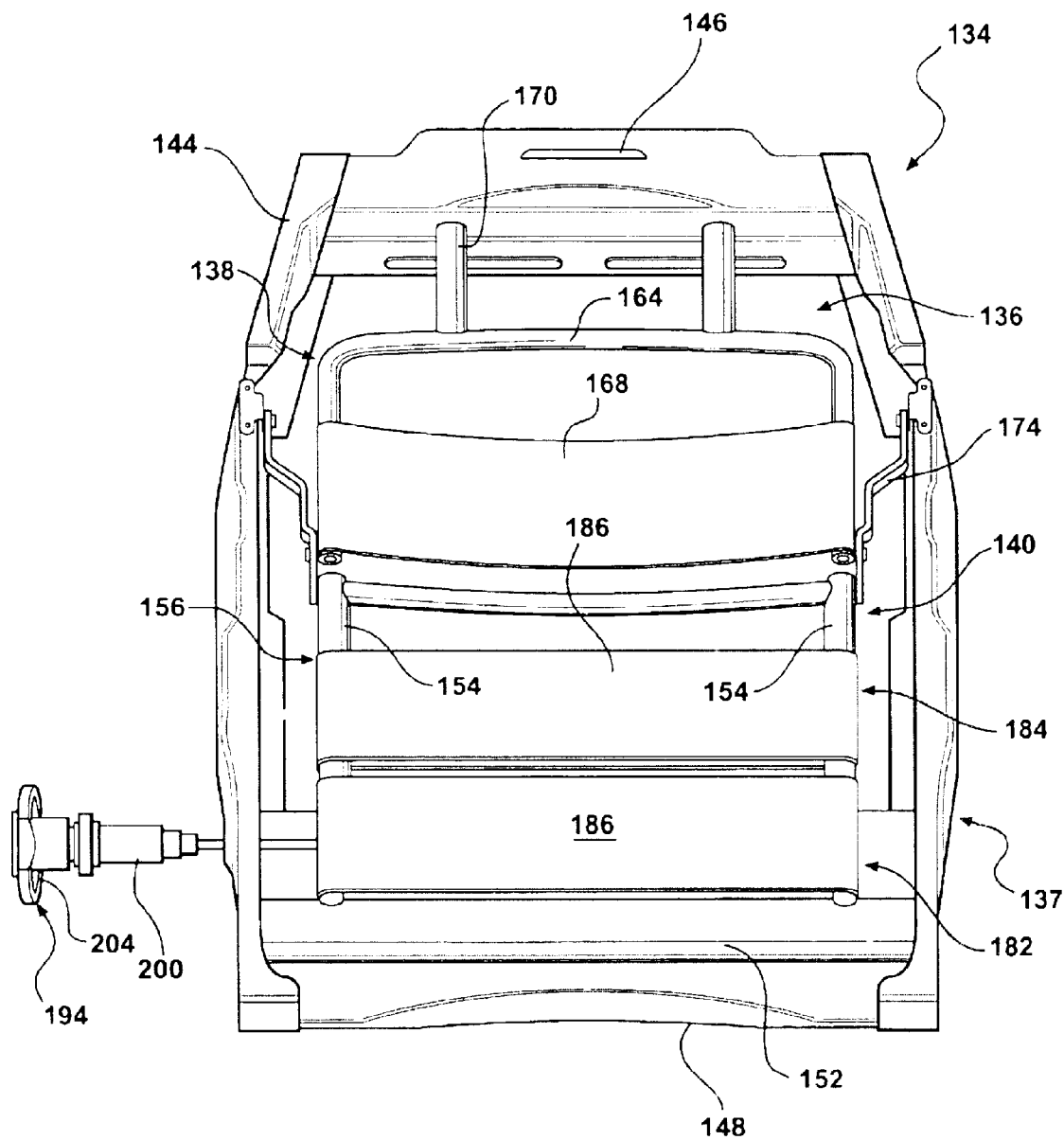
FIG. 4 is a front view of a seatback frame including an alternate embodiment of the lumbar support system of the present invention.
Figure 5:
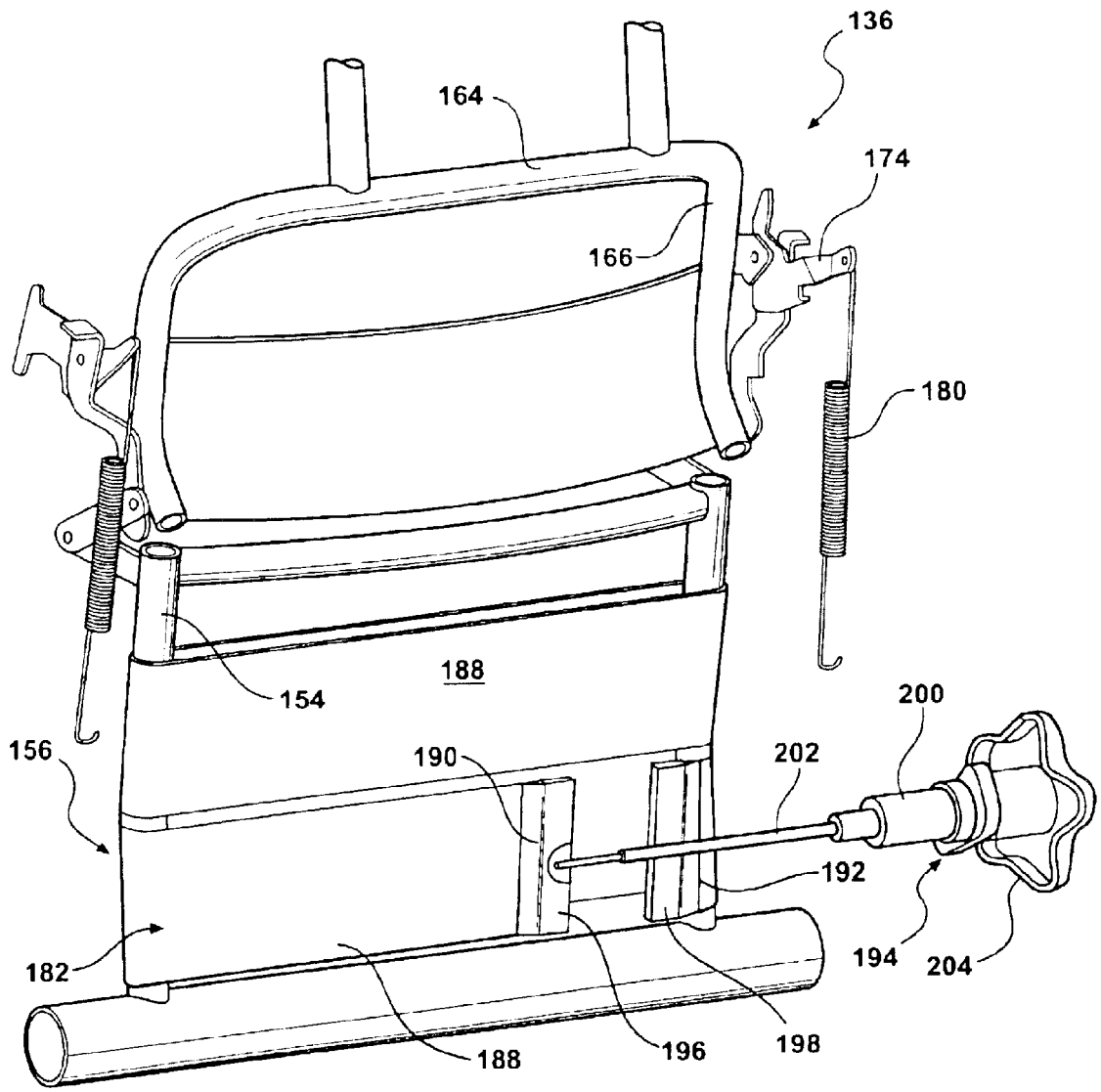
FIG. 5 is a rear elevational view of an active head restraint system employing the lumbar support system illustrated in FIG. 4.

An alternate embodiment of the lower suspension mechanism of the present invention is generally indicated at 156 in FIGS. 4 and 5, where like numerals increased by 100 are used to designate like structure with respect to that shown in FIGS. 2 and 3. The seatback frame 134 and active head restraint system 136 shown in this alternate embodiment are identical to the like components described with respect to FIGS. 2 and 3. Accordingly, that description will not be repeated here. Rather, the description that follows will focus upon the structural differences in the embodiment of the lower suspension mechanism 156 when compared to the like mechanism 56 illustrated in FIGS. 2–3.

More specifically, in the embodiment illustrated in FIGS. 4 and 5, the lower suspension mechanism 156 includes a pair of bands of flexible material 182, 184, that are disposed about the upstanding support members 154. The pair of bands include an upper lumbar suspension band 184 and a lower lumbar suspension band 182 disposed adjacent one another in vertical relationship about the upstanding support members 154. In addition, at least one of the bands of flexible material 182 defines a discontinuous loop so that it presents a pair of opposed terminal ends 190, 192, as best shown in FIG. 5. The other band 184 may define a continuous loop stretched between the upstanding support members 154. The opposed terminal ends 190, 192 are disposed in spaced relationship relative to one another. Furthermore, the lower suspension mechanism 156 further includes an adjustment mechanism, generally indicated at 194. The adjustment mechanism is operatively connected to at least one of the opposed terminal ends 190 or 192 of the one band of flexible material 182 and is operative to move one terminal end 190, 192 toward and away from the other end to change the predetermined tension of the band of flexible material 182. In the embodiment illustrated in FIGS. 4 and 5, only the lower lumbar suspension band 182 is adjustable such that the predetermined tension may be changed.

While the adjustment member 184 needs to be connected to only one of the terminal ends, in the preferred embodiment, the adjustment mechanism 194 is connected to both of the opposed terminal ends 190, 192 and is operative to move both the opposed terminal ends 190, 192 toward and away from one another to change the predetermined tension of the flexible band of material 182. Thus, at least one end 190 of the pair of opposed terminal ends of the band of flexible material 182 includes a fastening member 196 mounted thereon. The other end 192 includes a cable casing 198 mounted thereon. The adjustment mechanism 194 operatively interconnects the fastening member 196 and the cable casing 198 to move the opposed terminal end 190, 192 toward and away from one another. In the preferred embodiment, the fastening member 196 may include a J-hook or any other suitable fastening mechanism that may be sown into the terminal end 190 of the band of flexible material 182.

On the other hand, the adjustment mechanism 194 includes a cable actuator 200. A cable 202 is operatively connected to the fastening member 196 and the cable casing 198. As illustrated in the embodiments shown in FIGS. 4 and 5, the adjustment mechanism 194 includes a manual adjustment member 204 that is operatively connected to the cable actuator 200 for providing manual actuating force to the cable 202 in order to move the opposed terminal ends 190, 192 toward and away from one another. Thus, the occupant of the vehicle seat may manually adjust the tension presented by the lumbar support system 137 of the present invention with respect to the vehicle seat.

Figure 6:
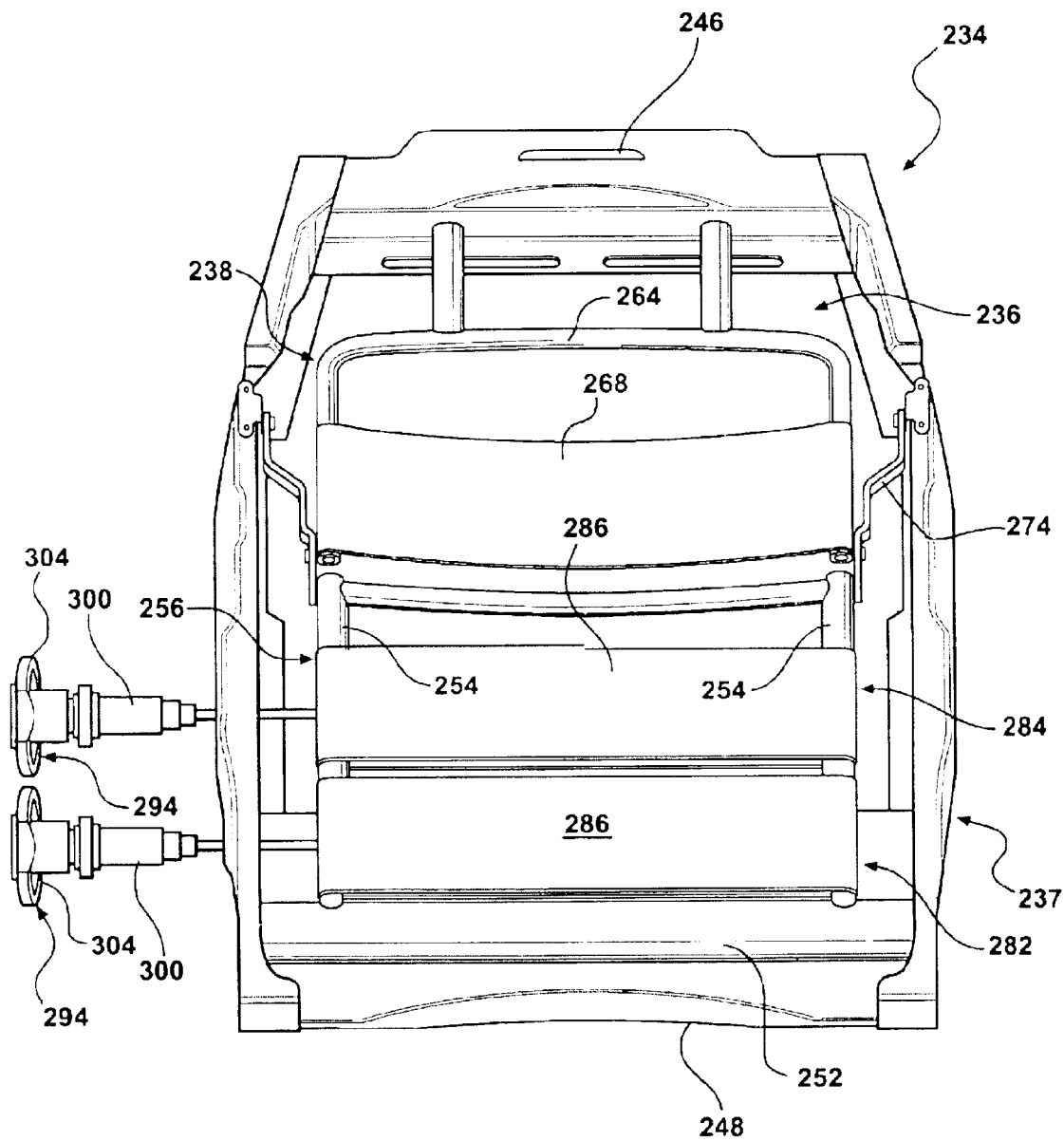
FIG. 6 is a front view of a seatback frame including still another embodiment of the lumbar support system of the present invention.
Figure 7:
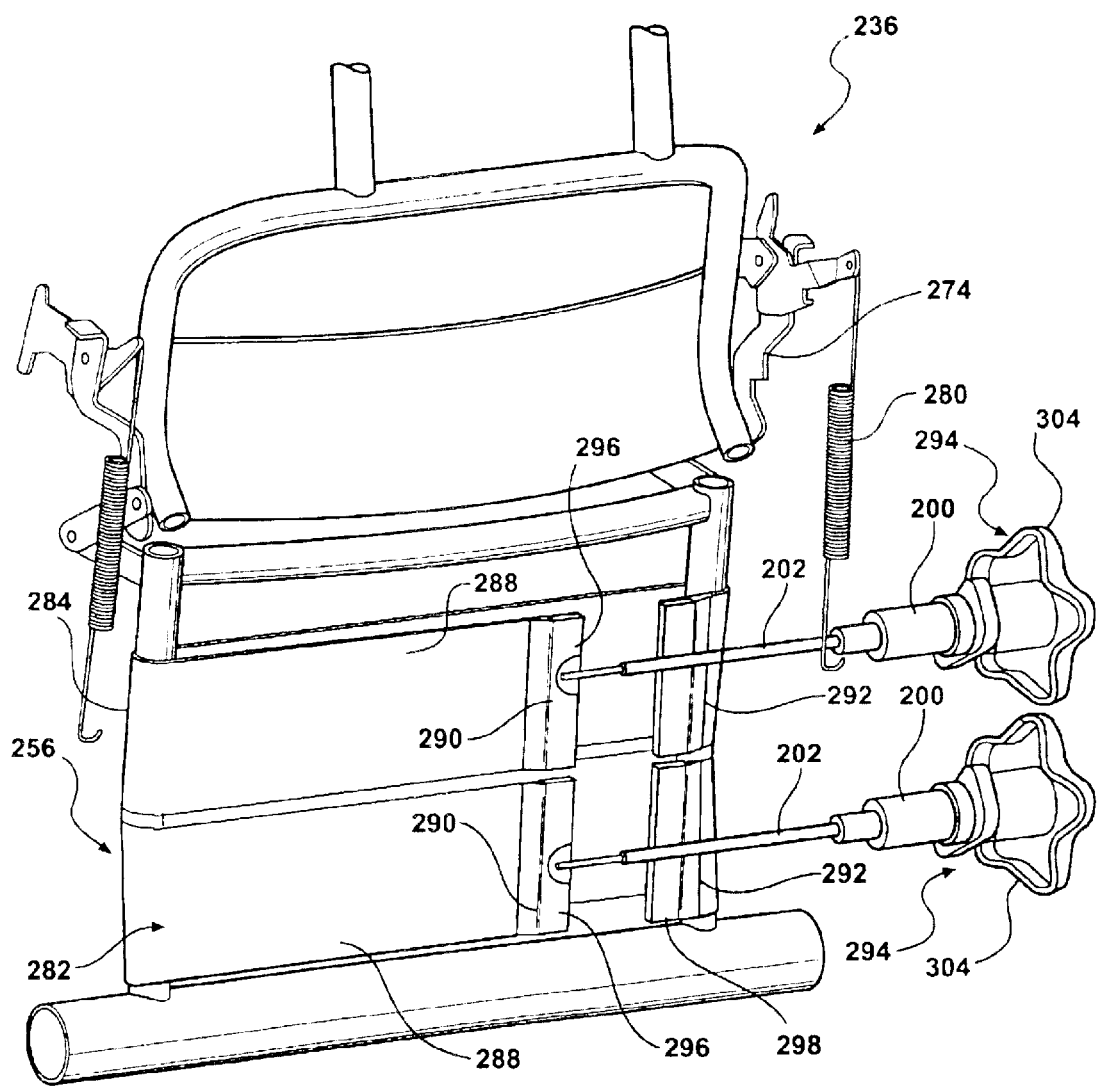
FIG. 7 is a rear elevational view of an active head restraint system employing the the lumbar support system illustrated in FIG. 6.

Another alternate embodiment of the lower suspension mechanism of the present invention is illustrated in FIGS. 6 and 7 where like numerals increased by 200 with respect to the embodiment illustrated in FIGS. 2 and 3 are used to designate like structure. The seatback frame 234 and active head restraint system 236 shown in this alternate embodiment are identical to the like components described with respect to FIGS. 2 and 3. Accordingly, that description will not be repeated here. Rather, the description that follows will focus upon the differences in the embodiment of the lower suspension mechanism 256 when compared to the like mechanism 56 illustrated in FIGS. 2–3. In this embodiment, both the upper lumbar suspension band 284 and the lower lumbar suspension band 282 define discontinuous loops so as to present a pair of opposed terminal ends 290, 292 disposed in spaced relationship relative to one another. In addition, a pair of adjustment mechanisms 294 are operatively connected to the opposed terminal ends 290, 292 to move the terminal ends 290, 292 toward and away from one another to change the predetermined tension of the band of flexible material 282, 284 in the same manner as described with respect to FIGS. 4 and 5.

Figure 8:
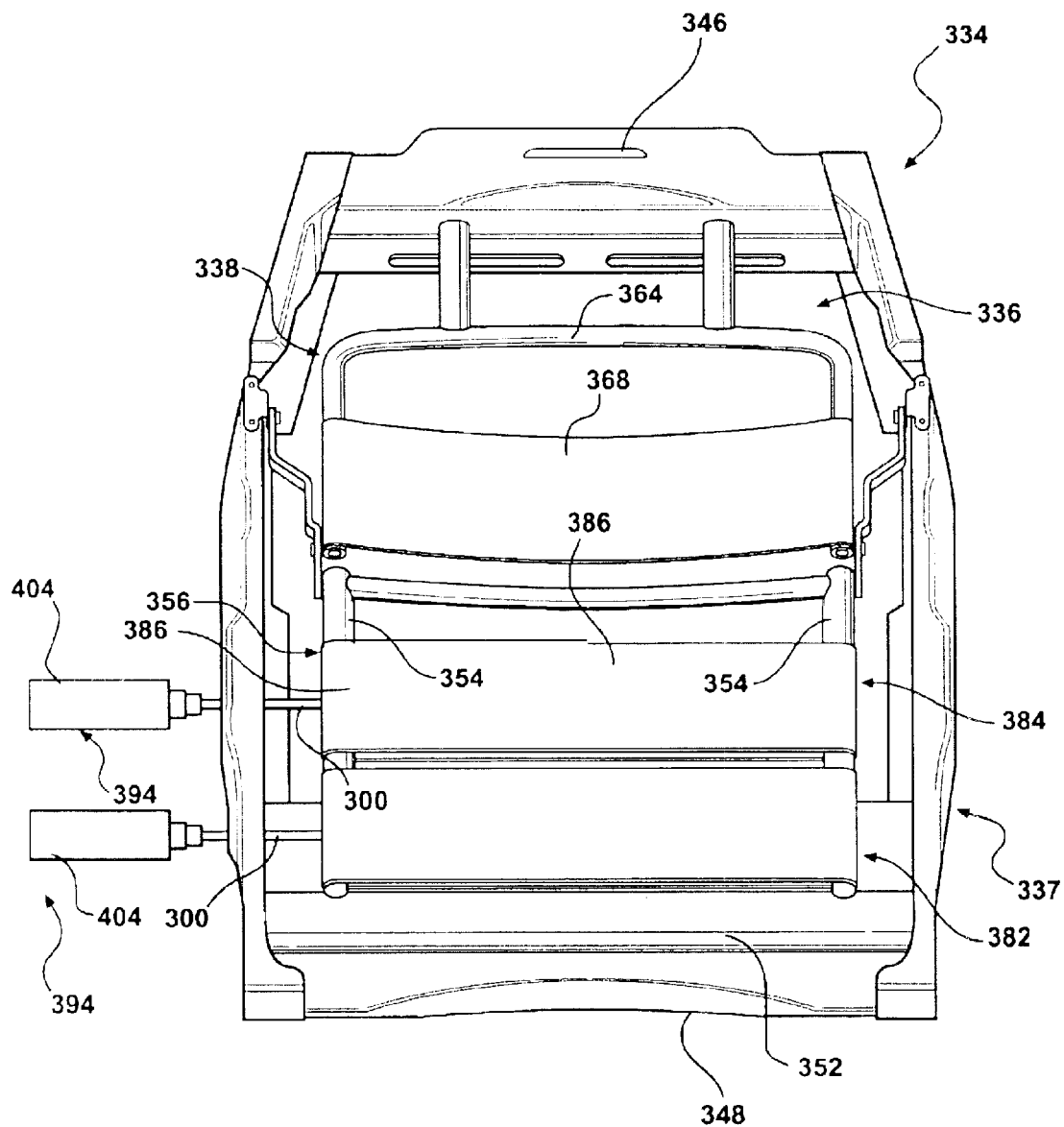
FIG. 8 is a front view of a seatback frame including still another embodiment of the lumbar support system of the present invention.
Figure 9:
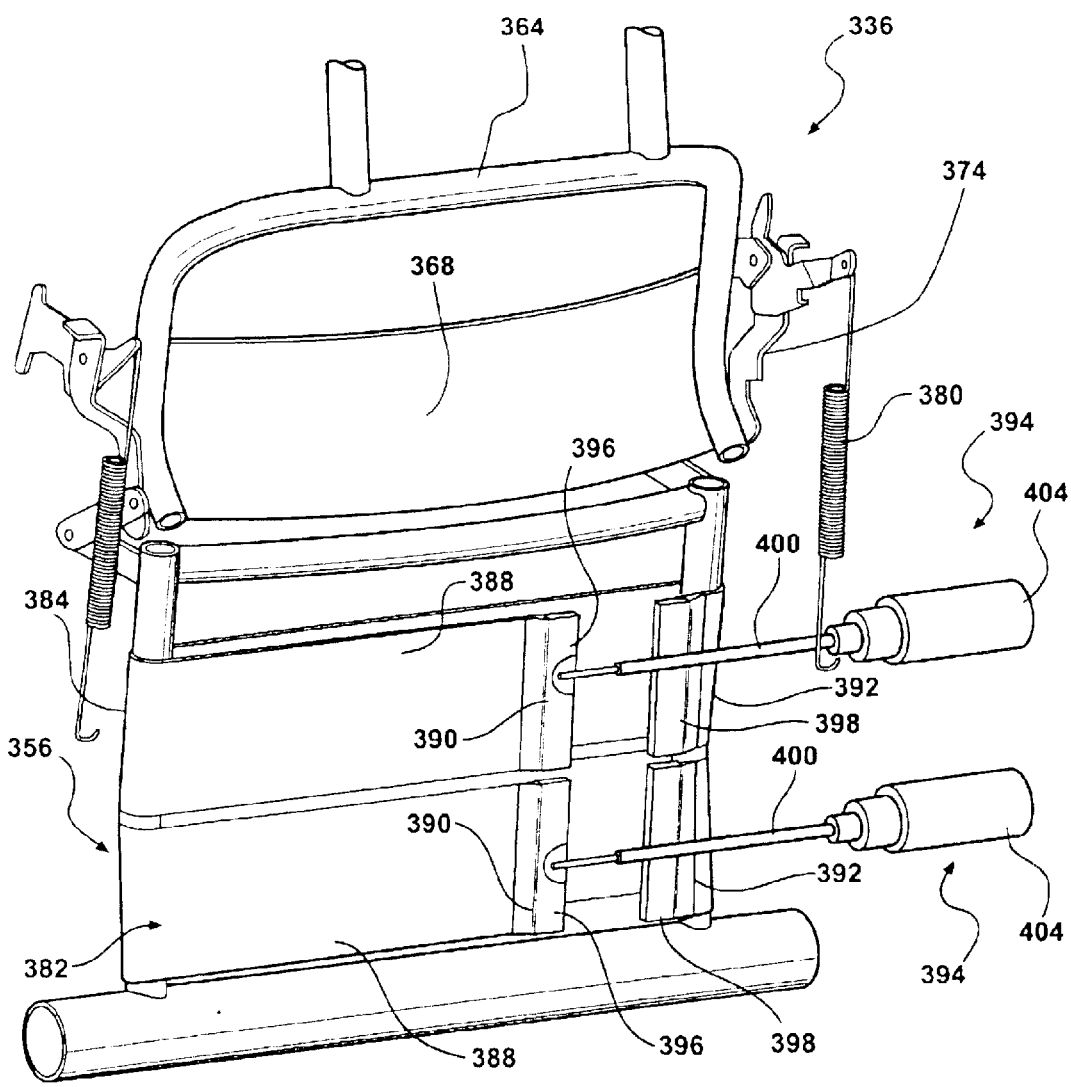
FIG. 9 is a rear elevational view of an active head restraint system that employs the the lumbar support system illustrated in FIG. 8.

Still another alternate embodiment of the lumbar support system is generally indicated at 337 in FIGS. 8 and 9, where like numerals increased by 300 are used to designate like structure with respect to the embodiment illustrated in FIGS. 2 and 3. The seatback frame 334 and active head restraint system 336 shown in this alternate embodiment are identical to the like components described with respect to FIGS. 2 and 3. Accordingly, that description will not be repeated here. Rather, the description that follows will focus upon the differences in the embodiment of the lower suspension mechanism 356 when compared to the like mechanism 56 illustrated in FIGS. 2–3. The lumbar support system 337 illustrated in FIGS. 8 and 9 is identical to that illustrated in FIGS. 6 and 7 except that the adjustment mechanism 394 includes a powered adjustment member 404 operatively connected to the cable actuator 400 for providing powered actuating force to the cable 402 to move the opposed terminal ends 390, 392 toward and away from one another.

In this way, the lumbar support systems 37, 137, 237, and 337 of the present invention provides the needed support in the pelvic and lumbar regions of the vehicle seat and is also capable of absorbing and dissipating the energy generated at the pelvic and lumbar regions by a force generated in the event of a rearward collision that exceeds a predetermined level. The forward surface of the bands of flexible materials in each embodiment are moveable toward the rearward surface of the band in each embodiment such that each band of flexible material absorbs energy generated by a force exceeding a predetermined level at the pelvic and lumbar regions 28, 30.

Furthermore, the adjustment capability of the lumbar support systems 137, 237, and 337 of the present invention allows the occupant of the seat to control the specific tension presented by the lower suspension mechanism as desired.

In addition, further comfort and safety are achieved when the lumbar support system of the present invention is incorporated into a seatback frame having a head restraint system. Thus, in the event of a rearward collision of sufficient force, the lower armature 40 acts to absorb the energy generated at the pelvic and lumbar regions and translates this energy to the upper armature 38 through the linkage 42. In response, the upper armature 38 and the headrest 62 pivot upwardly and forwardly through the action of the articulating brackets 74 thereby moving the headrest 26 toward the head 35 of the occupant 12. This is the initial response by the head restraint system 36 of the present invention. Thereafter, the upper armature 38 is further operable to absorb the energy generated at the thoracic region 32 such that the headrest 26 pivots further upwardly and forwardly by action of the articulating brackets 74 to close or otherwise eliminate any separation between the upper torso, neck, and head of the occupant 12 and the seatback 14.

In this way, the vehicle seat assembly of the present invention provides a lumbar support system that provides the needed support in the pelvic and lumbar regions of the vehicle seat and is also capable of absorbing and dissipating the energy generated at the pelvic and lumbar regions by a force generated in the event of a rearward collision that exceeds a predetermined level. In addition, the seat back assembly of the present invention may also include a head restraint system that is responsive to forces that are first generated and imparted to the seatback in the lumbar and pelvic region of the seat occupant even though these regions are disposed relatively remote from the headrest. The head restraint system of the present invention also acts to absorb, dissipate the energy generated by the force of the occupant that impinges on the seatback near the thoracic or shoulder region of the occupant and acts to further move the headrest upwardly and toward the head of the occupant thereby reducing the separation that can occur between the occupant and the seatback in the event of a collision. Finally, the vehicle seat assembly of the present invention addresses these specific problems in a system that is efficient, robust, and cost effective.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle seat assembly comprising:

a seatback frame and an active head restraint system operatively supported by said seatback frame;

said head restraint system including a headrest, an upper armature, a low armature, and a linkage operatively interconnecting said upper and lower armatures;

said upper armature pivotally mounted relative to said seatback frame so as to be generally aligned with the thoracic region of the occupant of said seat assembly, said headrest being operatively mounted to said upper armature;

said lower armature pivotally mounted to said frame in spaced relationship relative to said upper armature so as to be generally aligned with the pelvic and lumbar regions of the occupant of the seat assembly;

said lower armature including a lumbar support system, said lumbar support system including a pair of upstanding support members and a lower suspension mechanism that is generally aligned with the pelvic and lumbar regions of the occupant of said seat assembly;

said lower suspension mechanism including at least one band of flexible material disposed about said upstanding support members such that said band of flexible material presents a forward surface disposed between said upstanding support members immediately adjacent the pelvic and lumbar regions of the occupant of said seat assembly and a rearward surface disposed in spaced parallel relationship relative to said forward surface and relatively remote to said pelvic and lumbar regions with respect to said forward surface, said band of flexible material being stretched about said upstanding support members so as to have a predetermined tension for providing support for the occupant of said seat assembly at the pelvic and lumbar regions and, in the event of a rear impact on the vehicle, said forward surface being moveable toward said rearward surface such that said band of flexible material absorbs energy generated by a force exceeding a predetermined level at the pelvic and lumbar regions;

said lower armature being further operative to absorb energy generated by force exceeding a predetermined level at the pelvic and lumbar regions such that said lower armature acts on said upper armature through said linkage to cause said upper armature and said headrest to pivot upwardly and forwardly to move said headrest toward the head of the occupant of the seat assembly in an initial response to an impact exceeding a predetermined force; and said upper armature further operative to absorb energy generated by a force exceeding a predetermined level at the thoracic region such that said upper armature and said headrest pivots further upwardly and forwardly following the initial response by said lower armature to an impact that exceeds a predetermined force.

2. The vehicle seat assembly as set forth in claim 1 wherein said lower suspension mechanism includes a pair of bands of flexible material disposed about said upstanding support members, said pair of bands including an upper lumbar suspension band and a lower lumbar suspension band disposed adjacent one another in vertical relationship about said standing support members.

3. The vehicle seat assembly as set forth in claim 1 in said at least one band of flexible material defines a discontinuous loop disposed about said upstanding support members so as to present a pair of opposed terminal ends disposed in spaced relationship relative to one another, said lower suspension mechanism further including an adjustment mechanism connected to at least one of said opposed terminal ends and operable to move said at least one terminal end toward and away from the other to change the predetermined tension of said band of flexible material.

4. The vehicle seat assembly as set forth in claim 3 wherein in said adjustment mechanism is connected to both of said opposed terminal ends and operable to move said opposed terminal ends toward and away from one another to change the predetermined tension of said flexible material.

5. The vehicle seat assembly as set forth in claim 4 wherein in at least one end of said pair of opposed terminal ends of said band of flexible material includes a fastening member mounted thereon, and said other end includes a cable casing mounted thereon, said adjustment mechanism operatively interconnecting said fastening member and said cable casing to move said opposed terminal ends toward and away from one another.

6. The seat assembly as set forth in claim 5 wherein said adjustment member includes a cable actuator and a cable operatively connected to said fastening mechanism and said cable casing, said adjustment mechanism including a powered adjustment member operatively connected to said cable actuator for providing powered actuating force to said cable to move said opposed terminal ends toward and away from one another.

* * * * *